(12) United States Patent
Okaue

(10) Patent No.: US 6,712,977 B1
(45) Date of Patent: Mar. 30, 2004

(54) LIQUID CLARIFICATION METHOD AND APPARATUS

(76) Inventor: Kimihiko Okaue, 6-11, Hoshoen, Takarazuka-shi, Hyogo 655-0016 (JP)

( * ) Notice: Subject to any disclaimer, the term of this patent is extended or adjusted under 35 U.S.C. 154(b) by 251 days.

(21) Appl. No.: 09/890,296

(22) PCT Filed: Nov. 29, 2000

(86) PCT No.: PCT/JP00/08458

§ 371 (c)(1),
(2), (4) Date: Jul. 27, 2001

(87) PCT Pub. No.: WO01/40122

PCT Pub. Date: Jun. 7, 2001

(30) Foreign Application Priority Data

Dec. 3, 1999 (JP) .......................................... 11-376283

(51) Int. Cl.⁷ ................................................. C02F 1/42
(52) U.S. Cl. ....................... 210/688; 210/282; 210/283; 210/263; 210/243; 210/912; 210/723; 210/748
(58) Field of Search ................................ 210/282, 283, 210/263, 243, 912, 688, 723, 748

(56) References Cited

U.S. PATENT DOCUMENTS 4,752,397 A * 6/1988 Sood
6,033,572 A * 3/2000 Yano

FOREIGN PATENT DOCUMENTS

| JP | 6-226017 | 8/1994 |
|----|----------|--------|
| JP | 8-299703 | 11/1996 |
| JP | 28-41008 | 10/1998 |

* cited by examiner

Primary Examiner—Chester T Barry
(74) Attorney, Agent, or Firm—Pearne & Gordon LLP

(57) ABSTRACT

A clarification apparatus for liquid, characterized in that it has a first filtration layer (3) and a second filtration layer (4) and, arranged between the layers, an absorbing agent (5) comprising basic magnesium sulfate and magnesium hydroxide, wherein a liquid to be treated containing fine particles is passed through the absorbing agent (5), to thereby aggregate the fine particles in the liquid to be treated, and then the resulting large particles are caught by the second filtration layer (4) and wherein a liquid to be treated containing a heavy metal ion is passed through the absorbing agent (5), to thereby react the metal ion with a hydroxyl ion of the absorbing agent and solidify the metal ion, followed by aggregation, and then the resulting large particles are caught by the second filtration layer (4); and an apparatus which further has an electrode device capable of generating an OH ion, wherein the electrically generated OH ions the OH radicals of the absorbing agent (5) and the heavy metal ions react with one another, to thereby efficiently solidify the metal ions and aggregate the resultant solid into large particles, and then the resulting large particles are caught by the second filtration layer (4).

7 Claims, 7 Drawing Sheets

1: Container
2: Inlet for waste fluid
3: First filter layer
4: Second filter layer
5: Adsorbent 1: Container 2: Inlet for waste fluid 3: First filter layer 4: Second filter layer 5: Adsorbent 6: Electrode

LIQUID CLARIFICATION METHOD AND APPARATUS

TECHNICAL FIELD

The present invention relates to a liquid purification apparatus for purifying a wastewater, i.e., a liquid to be treated containing at least one of minute particles (for example, minute particles of dioxins, bacteria and the like), metal Ions, heavy metal ions and the like, such as, for example, a wastewater from an incinerator.

BACKGROUND ART

Conventionally, filtration of a wastewater containing very fine minute particles such as those of 0.1 μm or the like could not be effected even with ceramic filters having many minute apertures, and no other measure has been known except removal with hollow yarns. In addition, running costs required for an operation for solving clogging of ceramic filters are considerably high.

Therefore, in the conventional cases, minute particles were aggregated and precipitated by adding an aluminum or magnesium aggregation agent to the waste fluid, and the precipitated aggregates were removed by filtering with a press filter.

In addition, no other measure has been known for removal of heavy metals in discharged water except removal with a chelating agent effected separately from the above operation or removal with an ion-exchange resin.

PROBLEM TO BE SOLVED BY THE INVENTION

Measures as described above have been applied in the conventional apparatuses and methods, and removal of very fine minute particles has been made by aggregation and precipitation of the minute particles together with an aggregation agent through addition of the aggregation agent. Therefore, the aggregation agent should be added in a large amount and costs for the aggregation-precipitation product itself as well as its waste treatment could not be ignored. In addition, a large amount of precipitates were produced by the addition of a large amount of the aggregation agent, and hence the operation for filtration thereof under pressure with a press filter became enormous and costs therefore were remarkable.

Moreover, the removal of metal ions and heavy metal ions could only be performed with a chelate agent or an ion-exchange resin; this required an enormous expenses for the initial costs and the running costs and a problem occurred in the regeneration of a chelate agent that a large amount of a concentrated wastewater containing heavy metal ions was produced.

DISCLOSURE OF INVENTION

The invention has been made for solving the problems in conventional measures as described above.

The invention is made such that the purification is attained by placing an adsorbent comprising at least basic magnesium sulfate and magnesium hydroxide between a first and a second filter layers, passing a liquid to be treated through the adsorbent, thereby, causing aggregation of minute particles in the liquid to be treated so that a large mass is formed and then trapping it by the second filter layer.

This allows removal of the minute particles in the liquid to be purified without using a large amount of an aggregation agent, and the minute particles to be removed could be trapped and removed with a filter having openings about 100 times as large as the size of the minute particles to be removed.

In the invention, "purification" does not refer to a simple filtration with a filter, such as a trapping, in a space, of a particulate substance contained in a liquid to be treated by passing the liquid through the space having a given size, but refers to a trapping of a targeted substance in the above described space having a given size after aggregating the substance to form a mass having a certain dimension.

In another feature of the invention, a purification apparatus for a liquid to be treated is provided, such that metal ions are trapped by placing an adsorbent comprising at least basic magnesium sulfate and magnesium hydroxide between a first and a second filter layers, passing the liquid to be treated containing the metal ions through the adsorbent, thereby causing binding of the metal ions, particularly heavy metal ions, in the liquid to be treated to a hydroxyl group in an adsorbent resulting in flocculation, causing aggregation of flocculated particles so that a large mass is formed, and then trapping it by the second filter layer.

This allows removal of the metal ions or the heavy metal ions In the liquid to be treated without using a chelate agent or an aggregation agent.

Another feature of the invention is such that metal ions is trapped by placing an adsorbent comprising at least basic magnesium sulfate and magnesium hydroxide between a first and a second filter layers, electrically charging a direct current by electrode equipments, causing generation of OH ions in the liquid to be treated, causing binding of the OH ions and a hydroxyl group in the above described adsorbent to the metal or heavy metal ions in the liquid to be treated resulting in flocculation, causing aggregation of flocculated particles so that a large mass is formed, and then trapping it by the second filter layer. This allows removal of the metal ions or the heavy metal ions in the liquid to be treated with a low-cost apparatus without using a chelate agent or an aggregation agent.

Another feature of the invention is designed such that metal ions are trapped by placing an adsorbent comprising a powdery cellulose between a first and a second filter layers, electrically charging a direct current by electrode equipments, causing generation of OH ions in the liquid to be treated, causing binding of this OH ions and a hydroxyl group in the above described adsorbent to the metal or heavy metal ions in the liquid to be treated resulting in flocculation, and then trapping flocculated particles by the adsorbent and the second filter layer.

This allows removal of the metal ions or the heavy metal ions in the liquid to be treated with a low-cost apparatus without using a chelate agent or an aggregation agent.

BEST MODE FOR CARRYING OUT THE INVENTION

FIRST EXAMPLE

Figure 1:
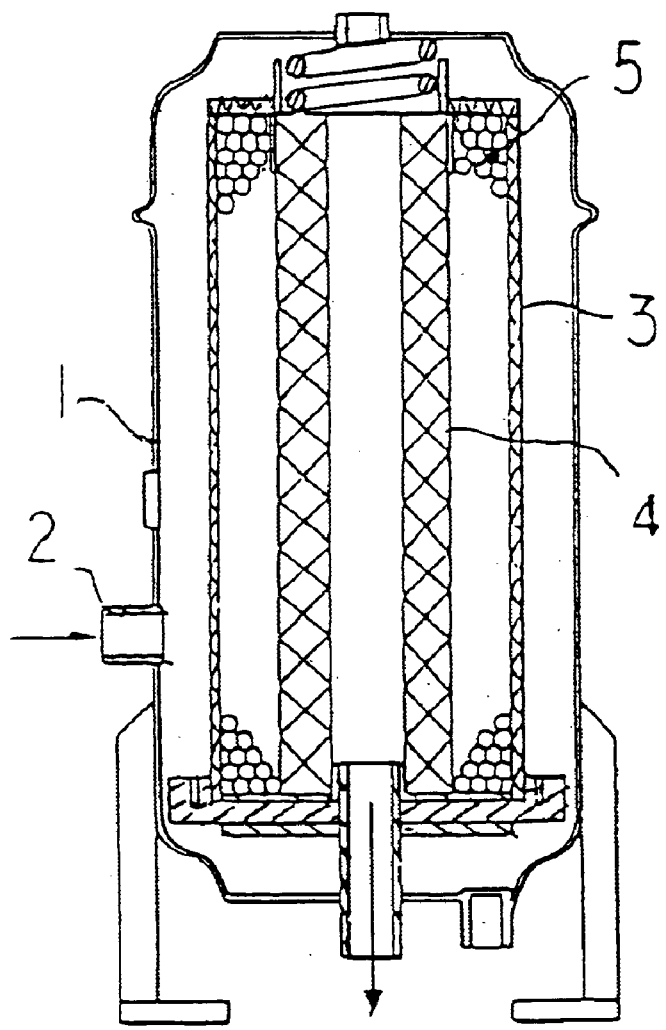
FIG. 1 is a side sectional view showing an example of a purification apparatus for a liquid to be treated according to the invention.

An example of the invention is described below with reference to drawings. FIG. 1 is a side sectional view showing an example of a purification apparatus according to the invention.

In the drawing, a waste fluid containing, for example, minute particles or heavy metal ions is charged under pressure by a pump from an inlet 2 for a liquid to be treated of a container 1. First and second filter layers 3 and 4 are placed in the container 1 and an adsorbent 5 is filled between the first and second filter layers 3 and 4. A built-up body with a cylindrical resin framework of polypropylene having a height of 500 mm and a diameter of 120 mm composed integrally of the first and second filter layer 3 and 4 and the adsorbent 5 constitutes an adsorbent cassette. The cassette was installed in the container 1 in the form of a cylinder, made of stainless steel, having a height of 750 mm and a diameter of 150 mm as shown in FIG. 1.

The adsorbent 5 filled in said adsorbent cassette consists preferably of:

94% or more of a basic magnesium sulfate represented by: $MgSO_4 \cdot 5Mg(OH)_2 \cdot 3H_2O$ [Chemical Formula 1]

Figure 11:
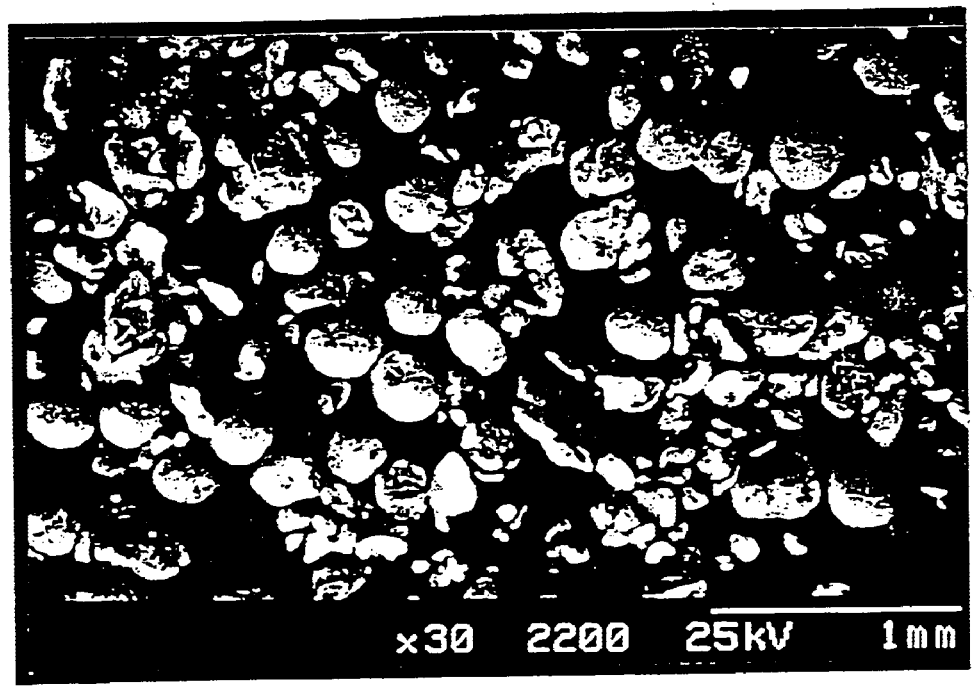
FIG. 11 is an expanded photograph in 30 magnifications of an adsorbent composed of 3 substances shown by Chemical Formula 1, Chemical Formula 2 and Chemical formula 3 obtained by a scanning electronic microscope.
Figure 12:
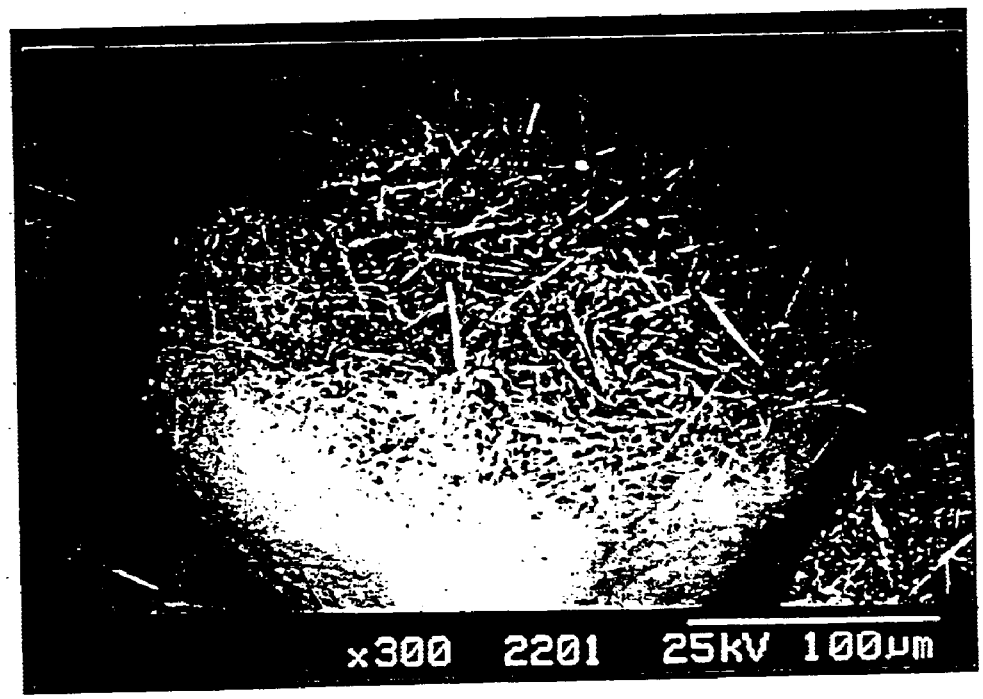
FIG. 12 is an expanded photograph in 300 magnifications of an adsorbent composed of 3 substances shown by Chemical Formula 1, Chemical Formula 2 and Chemical formula 3 obtained by a scanning electronic microscope.

6% or less of magnesium hydroxide represented by: $Mg(OH)_2$ [Chemical Formula 2] and 0.5% or less of magnesium sulfate represented by: $MgSO_4$ [Chemical Formula 3];

and its geometry is powdery or granular or particulate form, constituted of gathered crystalline fibers. Expanded photographs by a scanning electronic microscope are shown in FIG. 11 and FIG. 12. FIG. 11 and FIG. 12 are expanded photographs in 30 magnifications and 300 magnifications, respectively, of the adsorbent 5 composed of three substances shown by Chemical Formulae 1, 2 and 3.

The ratio of the contained components is not limited to the above-mentioned example, and may be anyone within a range of:

$2\% \leq MgSO_4 \cdot 5Mg(OH)_2 \cdot 3H_2O \leq 98\%$ [Chemical Formula 4] and $2\% \geq Mg(OH)_2 \geq 98\%$ [Chemical Formula 5].

Figure 10:
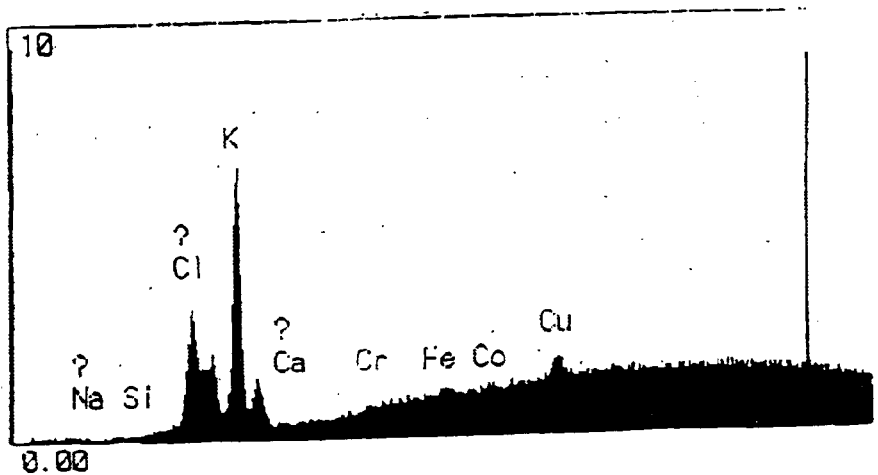
FIG. 10 is a graph showing a condition of metal contents after 20 times of repeated purification frequency with the example In FIG. 7 obtained by an X-ray microanalyzer.

When the amount of basic magnesium sulfate and that of magnesium hydroxide are less than or more than the above-mentioned range, they do not have a desired geometry (a geometry of a minute pill-like structure shown by the, photographs of scanning electronic microscope in FIG. 10 and FIG. 11).

That is, in the layer of adsorbent 5 sandwiched between the first and second filter layers 3 and 4, the concentration of metal ions becomes somewhat higher than that of metal ions in the liquid to be treated by the adsorbent 5. This fact can be explained by the Schulze Hardy's law for some kinds of liquids to be treated. However for some other kinds of liquids to be treated, that fact can not necessary be explained. However, according to experiments, for all the substances of non-acidic liquids to be treated, the liquid purification according to the invention was effective.

Next, action in the first example described above is illustrated with FIG. 2.

Figure 2:
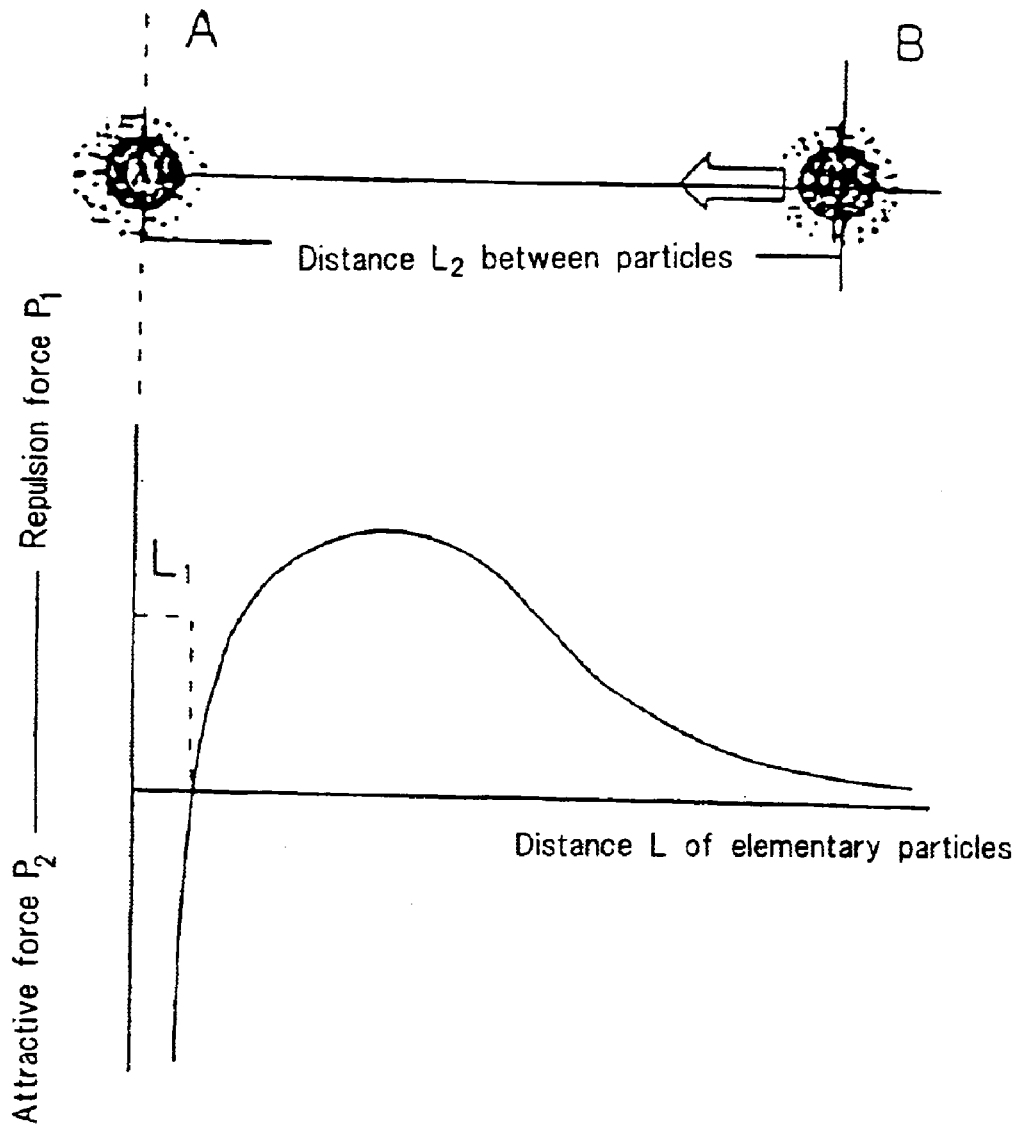
FIG. 2 is a graph of a characteristic curve for the potential energy.

FIG. 2 is a characteristic curve for the potential energy; the particle distance L between minute particles A and B is plotted along the abscissa axis and the repulsion force $P_1$ and the absorption force $P_2$ are plotted along the ordinate axis.

When a liquid to be treated containing heavy metal ions are charged through the inlet 2 for the liquid to be treated into the container 1 in FIG. 1 under pressure by a pump, the waste fluid flows through the first filter layer 3 to the adsorbent 5. Because the adsorbent 5 has a powdery or granular or particulate constitution, the waste fluid passes through in-between spaces. The mutual distance L between the minute particles A and B in the liquid to be treated shown in FIG. 2 changes from distance $L_1$ to distance $L_2$ or less: an attractive force $P_2$ acts between the minute particles A and B in the liquid to be treated so that they aggregate together forming large masses of about 300 times in size. This has been confirmed by collaboration with Osaka Municipal Technical Research Institute.

The minute particles in the form of large masses are trapped and removed by the second filter layer 4 (placed downstream of the adsorbent 5 in the flowing direction of the liquid to be treated) having sufficiently rough openings as compared with individual minute particles.

For example, even the minute particles are of 0.1 μm and could conventionally be trapped only by hollow yarns, they can be removed with a filter of 10 μm used as the second filter layer.

In the example, a filter paper having a mesh size of 100 μm was used as the first filter layer 3. The mesh size may be anyone that has openings finer than the powdery or granular or particulate adsorbent 5.

In addition, when the adsorbent 5 is in a powdery form, there is a possibility of causing clogging in spaces, because in-between spaces between powders are narrow. In this case, the clogging may be prevented by broadening the in-between spaces by using as spacers, for example, an activated carbon in particulate form or the like having a specific gravity close to that of the adsorbent 5. When spaces are broadened by inserting spacers in this manner, action of the adsorbent described below has not been adversely affected.

Silica which causes clogging of reverse osmotic membranes has conventionally been considered irremovable.

However, by using the example having a constitution of FIG. 1, it can be removed to an extent in which the clogging of reverse osmotic membranes can sufficiently be prevented, as shown in Table 1. In this case, well water (the well water has generally a high content of silica) was used as the liquid to be purified (liquid to be treated), and a cartridge filter of 10 μm was used as the second filter layer 4. Purification frequency in Table 1 refers to a frequency of passing with repeated circulation of the liquid to be treated through the purification apparatus having the constitution shown in FIG. 1.

TABLE 1

| Purification Frequency | Well water | Once | 3 times | 5 times | 10 times | 20 times |
|---|---|---|---|---|---|---|
| Silica (mg/l) | 34.4 | 25.0 | 21.0 | 16.3 | 15.4 | 7.8 |

In the desalinization of seawater, in order to prolong the period before causing clogging of reverse osmotic membrane, various measures have been studied for suppressing the FI value (Fouling Index or Silt Density Index) as an index to indicate the degree of contamination to 3 or below. However, it has been considered that the FI value cannot be lowered to 3 or below, up to the present.

By using the example in FIG. 1, however, the FI value could easily be lowered to 3 or below as shown in Table 2.

In this case, a cartridge filter of 10 μm was all used as the second filter layer 4. As method of measurement therein, a method of December 1987, established by Nitto Electric Chemical Co., Ltd., Japan, was used.

TABLE 2

| Purification frequency | Seawater | 5 times | 10 times |
|---|---|---|---|
| FI value | 4.31 | 2.62 | 2.47 |

In addition, when heavy metal ion, for example, lead in the liquid to be treated passes through an in-between spaces between the adsorbents 5 in powdery or granular or particulate form, lead ions is bound to a hydroxyl group in the adsorbent 5 causing a reaction shown in the following [Chemical Formula 6]:

$$Pb^{++}+2(OH)^{-}{}_{2} \rightarrow Pb(OH)_2 \quad \text{[Chemical Formula 6]}$$

As shown by the [Chemical Formula 6], lead ions $Pb^{++}$ is converted to $Pb(OH)_2$ forming flocks; and the flocks aggregate while passing through the adsorbent 5 forming masses of about 300 times in size, and is trapped by the second filter layer 4.

Table 3 shows result measured using atomic absorption analysis in washing of worker's uniforms with lead powders adhered in a plant; the result shows degree of lead removal in washing wastewater. In this case, a cartridge filter of 10 μm was used as the second filter layer 4.

TABLE 3

| Purification Frequency | Wastewater | Once | 3 times | 5 times |
|---|---|---|---|---|
| Lead, content (ppm) | 0.696 | 0.015 | 0.007 | 0.004 |

As shown in Table 3, lead minute particles and lead ions, which have conventionally been considered removable only with a chelate agent or a high molecule aggregation agent, in the wastewater was able to be removed by the apparatus of the invention; and the costs therefor were 1/10 or less in the initial costs and 1/20 or less in the running costs as compared with the conventional one. In addition, in the case of the apparatus of the invention, a space for placing-the installation was about 1/30 as compared with the above-described conventional method.

Next, an example for removing heavy metal ions in a silicon electrolysis waste fluid from a factory for processing silicon material for semiconductor element in Example 1 of FIG. 1 is described.

Figure 3:
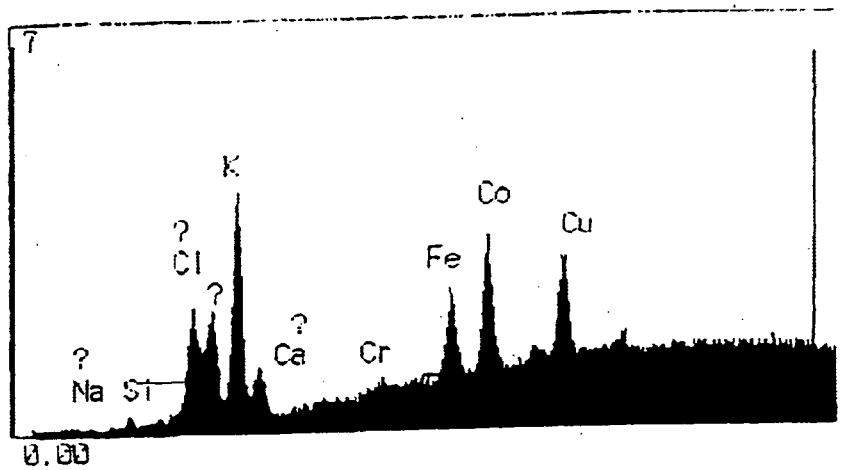
FIG. 3 is a graph showing a-condition of metal contents in a waste fluid from silicon electrolysis before purification obtained by an X-ray microanalyzer.
Figure 4:
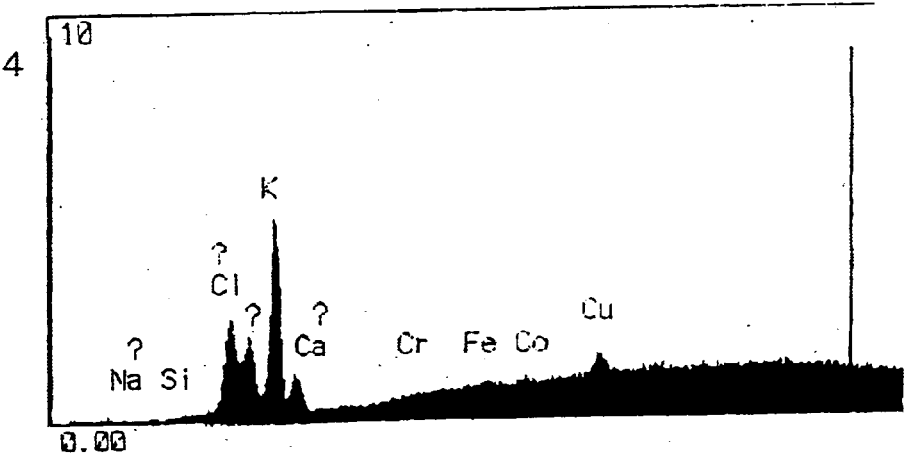
FIG. 4 is a graph showing a condition of metal contents after 3 times of repeated purification frequency with the example in FIG. 1 obtained by an X-ray microanalyzer.
Figure 5:
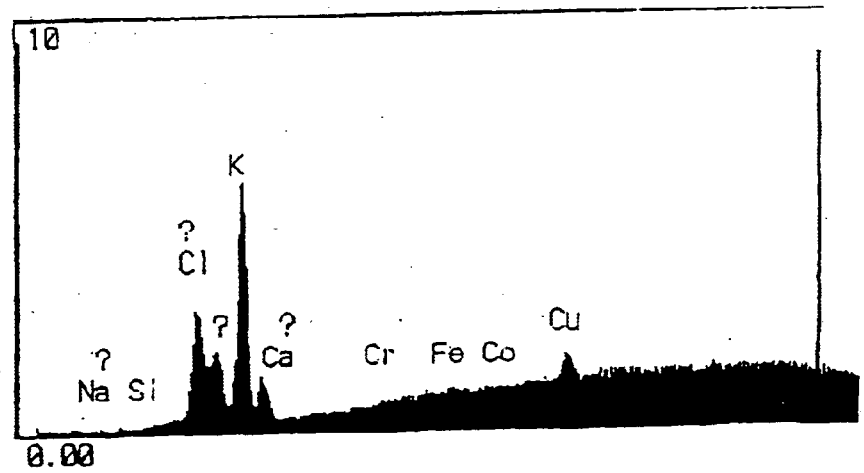
FIG. 5 is a graph showing a condition of metal contents after 20 times of repeated purification frequency with the example in FIG. 1 obtained by an X-ray microanalyzer.

FIG. 3, FIG. 4 and FIG. 5 show graphs of conditions of metal contents obtained by an X-ray microanalyzer using the apparatus of the example in FIG. 1.

FIG. 3 shows metal contents in a waste fluid from silicon electrolysis before purification; FIG. 4 shows metal contents in the purification liquid after 3 times of purification frequency, being purified with a cartridge filter of 10 μm as the second filter layer 4, and; FIG. 5 shows metal contents in the purified liquid after 20 times of circulated purification frequency, being purified with a cartridge filter of 10 μm as the second filter layer 4, respectively.

The data are summarized in Table 4.

TABLE 4

| Metal | Co | Fe | Cu | Si |
|---|---|---|---|---|
| Waste fluid (mg/l) | 7.76 | 5.20 | 9.08 | 30.17 |
| 3 times (mg/l) | 0.46 | 1.12 | 5.58 | 0.00 |
| 20 times (mg/l) | 0.10 | 0.74 | 5.09 | 0.00 |

As shown in Table 4, the heavy metals were removed to an almost satisfactory degree.

As an exception, as shown in [Chemical Formula 7], copper ions exist in water in a state in which it can hardly bind to hydroxyl group. Therefore, removal thereof was considerably difficult.

$$[Cu(H_2O)_4]^{+2} \quad \text{[Chemical Formula 7]}$$

SECOND EXAMPLE

Figure 6:
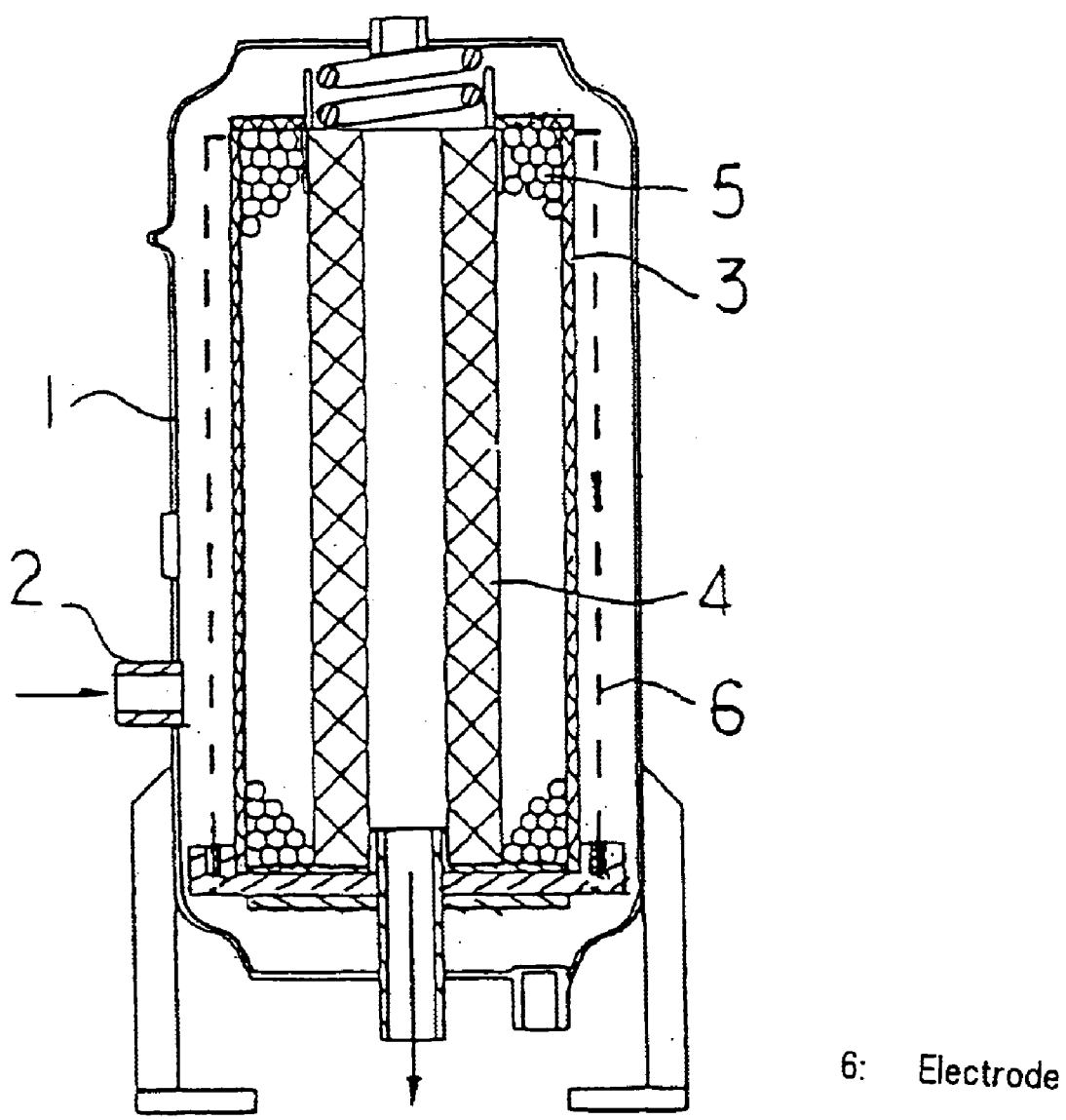
FIG. 6 is a side sectional view showing another example of a purification apparatus for a liquid to be treated according to the invention.

FIG. 6 is a side sectional view showing the second example of the invention, and made in the same size and material as that in FIG. 1. In FIG. 6, however, an electrode 6 is composed, for example, in a network form; and, for example, a direct voltage of +2 V is charged using the container 1 as the earth electrode; the electrode 6 and the container 1 constitute electrode equipments. As the adsorbent 5, the same material as that in the first example is used.

Through the electrode equipments, a direct current of 4.5 mmA passes in a liquid to be treated in the container 1; and in the case that the direct current is of this value, H ions and OH ions generate as shown in the following Chemical Formula 8, without generating hydrogen gas and oxygen gas.

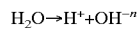

$$H_2O \rightarrow H^+ + OH^{-n} \quad \text{[Chemical Formula 8]}$$

The OH ions and the hydroxyl group in the adsorbent 5 bind to the heavy metal ions in the waste fluid, thereby causing flocking as afore-mentioned; the flocked particles are aggregated by adsorbent 5; and then they are trapped with the second filter layer 4.

In this manner, the heavy metal ions can be removed more effectively by placing the electrode equipments and electrically charging a direct current of an appointed value, thereby generating compulsorily OH ions in the waste fluid.

Although in the above-described example, a case that a direct voltage was charged between the electrode 6 and the container 1 made of conductor was shown, in an alternative embodiment an earth electrode or a negative electrode may be equipped separately from the container 1.

In addition, as a further alternative embodiment, the electrode 6 may be omitted by replacing the first filter layer 3 consisting of a filter paper of 100 μm by a network electrode of 100 μm mesh stainless steel.

Moreover, although the above-described example has shown a case that a direct voltage of +2 V was charged, the important thing is not the voltage value but is an electric current value for generating OH ions shown in Chemical Formula 8.

That is, in the apparatus in FIG. 6, when the electric current value passed through water exceeds about 9.2 mA, oxygen gas is generated, and when it exceeds about 23 mA, hydrogen gas is generated.

Therefore, by taking a safety factor of twice, preferred electric current value is about 4.5 mA; on the other hand, allowable maximum electric current value is about 23 mA, above which hydrogen gas is generated, or under.

THIRD EXAMPLE

Figure 7:
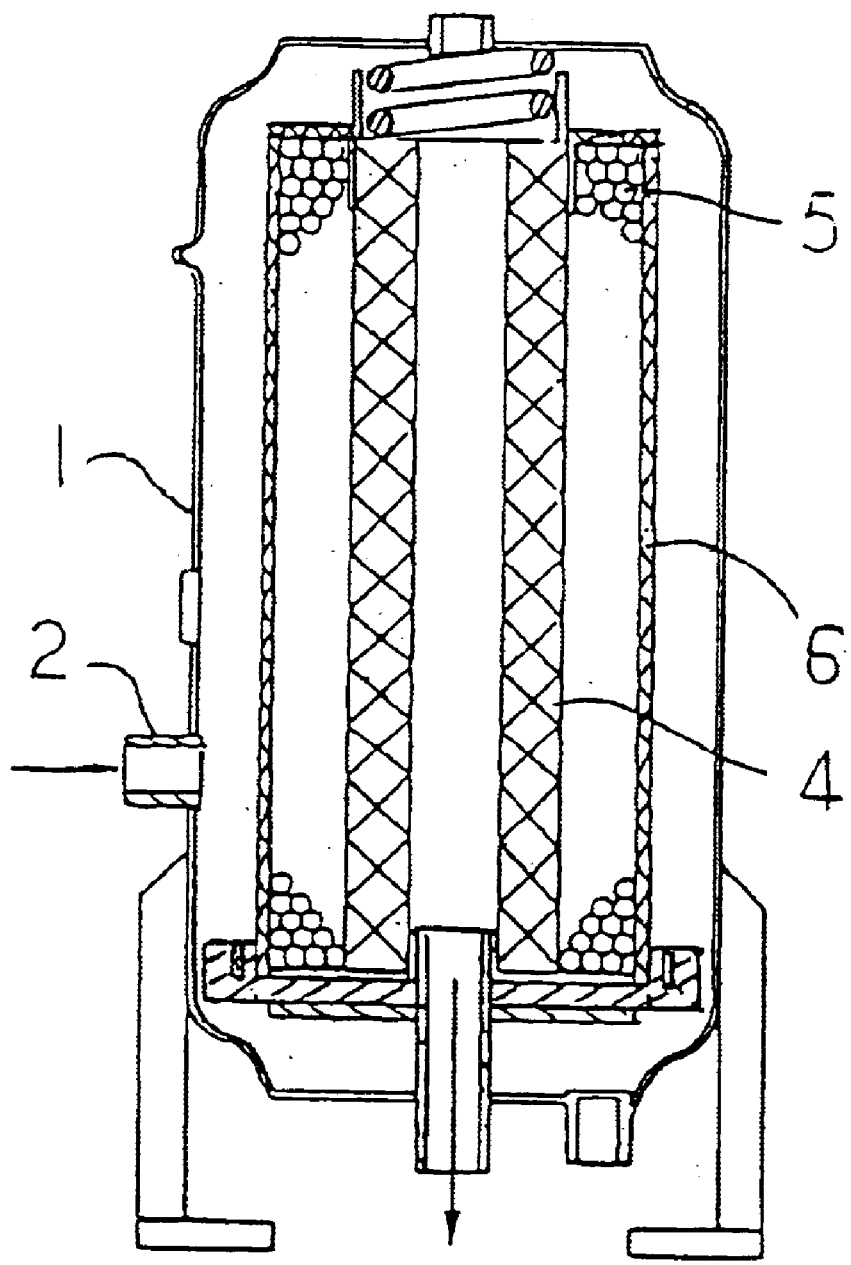
FIG. 7 is a side sectional view showing a still another example of a purification apparatus for a liquid to be treated according to the invention.

FIG. 7 is a side sectional view showing a third example of the invention. The difference of the third example from the example in FIG. 6 is that powders of cellulose are used as the adsorbent 5.

That is, while the second example in FIG. 6 has used an adsorbent having an aggregating ability and hydroxyl group as shown in [Chemical Formula 1], [Chemical Formula 2] and [Chemical formula 3], the example in FIG. 7 has used an adsorbent having no hydroxyl group. As the adsorbent 5 in FIG. 7, powders of cellulose acting to assist filtration by the second filter layer 4 was used, OH ions for binding to the heavy metal ions depends exclusively on that given by a network electrode 6.

In the third example in FIG. 7, the first filter layer 3 in FIG. 6 is changed to a network electrode 6, similarly to the modified example described in the latter half of the second example of FIG. 6.

Next, description is made on an example for removing heavy metal ions in a silicon electrolysis waste fluid with the example in FIG. 7.

Figure 8:
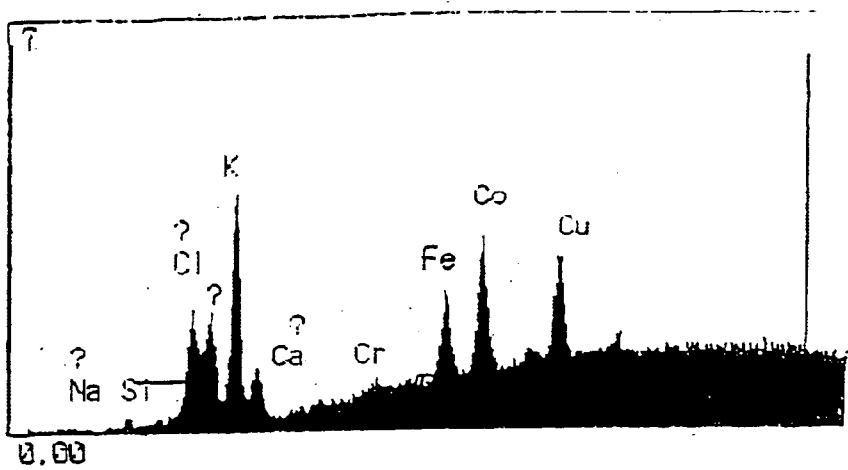
FIG. 8 is a graph showing a condition of metal contents in a waste fluid from silicon electrolysis before purification obtained by an X-ray microanalyzer.
Figure 9:
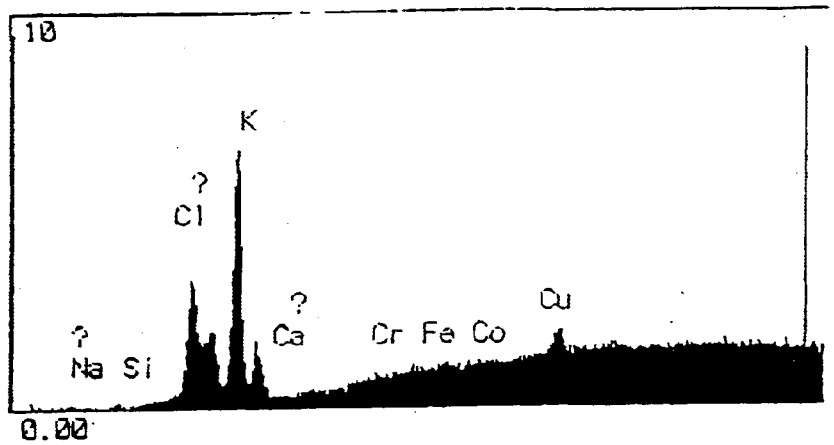
FIG. 9 is a graph showing a condition of metal contents after 3 times of repeated purification frequency with the example in FIG. 7 obtained by an X-ray microanalyzer.

FIG. 8, FIG. 9 and FIG. 10 are graphs showing a condition of metal contents obtained by an X-ray microanalyzer similar to those in FIG. 3, FIG. 4 and FIG. 5. FIG. 8 shows metal contents in a waste fluid from silicon electrolysis before purification; FIG. 9 shows metal contents in the purification liquid after 3 times of purification frequency purifying with a cartridge filter of 10 μm as the second filter layer 4, and FIG. 10 shows metal contents in the purified liquid after 20 times of repeated circulation purification frequency purifying with a cartridge filter of 10 μm as the second filter layer 4, respectively.

In addition, data thereof are summarized in Table 5.

TABLE 5

| Metal | Co | Fe | Cu | Si |
|---|---|---|---|---|
| Waste fluid (mg/l) | 7.76 | 5.20 | 9.08 | 30.17 |

TABLE 5-continued

| Metal | Co | Fe | Cu | Si |
|---|---|---|---|---|
| 3 times (mg/l) | 0.20 | 0.84 | 5.29 | 0.00 |
| 20 times (mg/l) | 0.11 | 1.11 | 5.25 | 0.00 |

As shown in Table 5, the heavy metals were removed to an almost satisfactory level in the example in FIG. 7.

FIG. 11 and FIG. 12 are magnified photographs in 30 magnifications and 300 magnifications obtained by a scanning electronic microscope, respectively, of an adsorbent which is composed of 3 substances shown by [Chemical Formula 1], [Chemical Formula 2] and [Chemical formula 3]. According to FIG. 11, the adsorbent is of minute particle form, but each of the minute particles further has a structure in which minute needles gathered in the pill-like form according to 300 times magnification photograph in FIG. 12. It is estimated from the phenomenological theory that such a minute structure closely relates to the effective removal of the minute particles in the liquid to be treated having far smaller size than the spaces among the minute particle forms.

INDUSTRIAL APPLICABILITY

As described above, according to the invention, the minute particles in the liquid to be purified can be removed without use of a large amount of an aggregation agent as in the conventional method, and with use of a filter having large openings about 100 times as coarse as the size of the minute particles to be removed; and moreover, the metal ions or the heavy metal ions in the liquid to be treated can be removed without using a chelate agent or an aggregation agent; and therefore, the invention has a great industrial applicability.

I claim:

1. A purification apparatus for a liquid to be treated characterized in that it has first and second filter layers for filtering the liquid to be treated, an absorbent placed between said first and second filter layers and containing at least basic magnesium sulfate and magnesium hydroxide, and electrode equipment for electrically charging a direct current through said liquid to be treated and generating OH ions in the liquid, and in that it is designed such that the OH ions generated by said electrode equipments as well as, the hydroxyl group in said absorbent are bound to the metal ions in the liquid to be treated resulting in flocculation, particles flocculated in this manner are aggregated, and then trapped by said second filter layer.

2. A purification apparatus for a liquid to be treated characterized in that it has first and second filter layers for filtering the liquid to be treated, an absorbent placed between said first and second filter layers and containing a powdery cellulose, and electrode equipment for electrically charging a direct current through said liquid to be treated and generating OH ions in the liquid to be treated, and in that it is designed such that the OH ions generated by said electrode equipments is bound to the metal ions in the liquid to be treated resulting in flocculation, particles flocculated in this manner are trapped by said absorbent and said second filter layer.

3. The apparatus according to any one of claims 1 to 2 wherein said metal ions are heavy metal ions.

4. A process for purifying a liquid to be treated characterized in that it comprises:

step in which the liquid to be treated is passed through a first filter layer, step in which the liquid to be treated passed through said first filter layer is passed through a layer of an absorbent placed downstream of said first filter layer, subsequently thereto, and comprising at least basic magnesium sulfate and magnesium hydroxide, step in which said metal ions, are bound by further passing the liquid to be treated passed through the layer of absorbent through a layer of the second filter layer placed downstream of said layer of absorbent and subsequently thereto causing flocculation, and further aggregating the flocculated particles so that a mass is formed, and step in which the liquid to be treated passed through said layer of absorbent is trapped by a second filter layer placed downstream of said layer of absorbent and subsequently thereto.

5. A process for purifying a liquid to be treated characterized in that it comprises:

step in which the liquid to be treated is passed through a first filter layer, step in which a direct current is electrically charged through said liquid to be treated so that OH ions are generated in the liquid to be treated, step in which the liquid to be treated passed through said first filter layer is passed through a layer of an absorbent placed downstream of said first filter layer, subsequently thereto, and containing at least basic magnesium sulfate and magnesium hydroxide, step in which the OH ions generated by said electric current as well as a hydroxyl group in said absorbent are bound to the metal ions in the liquid to be treated resulting in flocculation, and further flocculated particles are aggregated, and step in which an aggregate formed in said aggregation is trapped by a second filter layer placed downstream of said layer of absorbent and subsequently thereto.

6. A process for purifying a liquid to be treated characterized in that it comprises:

step in which the liquid to be treated is passed through a first filter layer, step in which a direct current is electrically charged through said liquid to be treated so that OH ions are generated in the liquid to be treated, step in which the liquid to be treated passed through said first filter layer is passed through a layer of an absorbent placed downstream of said first filter layer, subsequently thereto, and containing powdery cellulose, step in which the OH ions generated by said electric current are bound to the metal ions in the liquid resulting in flocculation, and step in which particles flocculated in this manner are trapped by said layer of absorbent and a second filter layer placed downstream of said layer of absorbent and subsequently thereto.

7. The process according to any one of claims 4 to 6, wherein said metal ions are heavy metal ions.

\* \* \* \* \*

UNITED STATES PATENT AND TRADEMARK OFFICE
CERTIFICATE OF CORRECTION

PATENT NO. : 6,712,977 B1
DATED : March 30, 2004
INVENTOR(S) : Kimihiko Okaue

It is certified that error appears in the above-identified patent and that said Letters Patent is hereby corrected as shown below:

Column 8,
Lines 50 and 64, please delete "equipments" and insert therefor -- equipment --.

Signed and Sealed this

Twenty-third Day of November, 2004

JON W. DUDAS
*Director of the United States Patent and Trademark Office*